Figure 1:
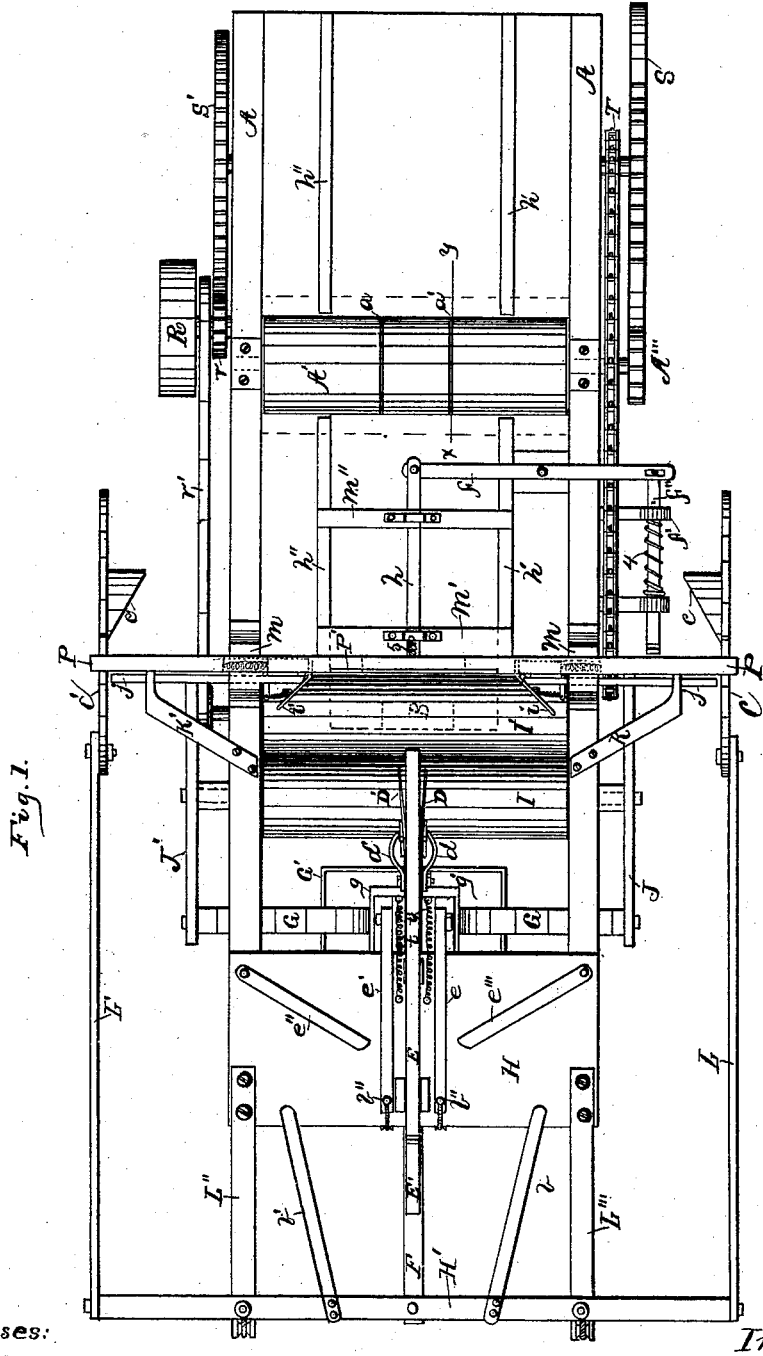

(No Model.) 9 Sheets—Sheet 1.
J. N. CHADSEY.
APPARATUS FOR MAKING SATCHEL BOTTOM PAPER BAGS.
No. 352,118. Patented Nov. 9, 1886.

Witnesses:
A. Davenport
John T. Booth

Inventor.
John N. Chadsey
by Gw. A. Mosher
atty.

(No Model.) 9 Sheets—Sheet 2.
J. N. CHADSEY.
APPARATUS FOR MAKING SATCHEL BOTTOM PAPER BAGS.
No. 352,118. Patented Nov. 9, 1886.
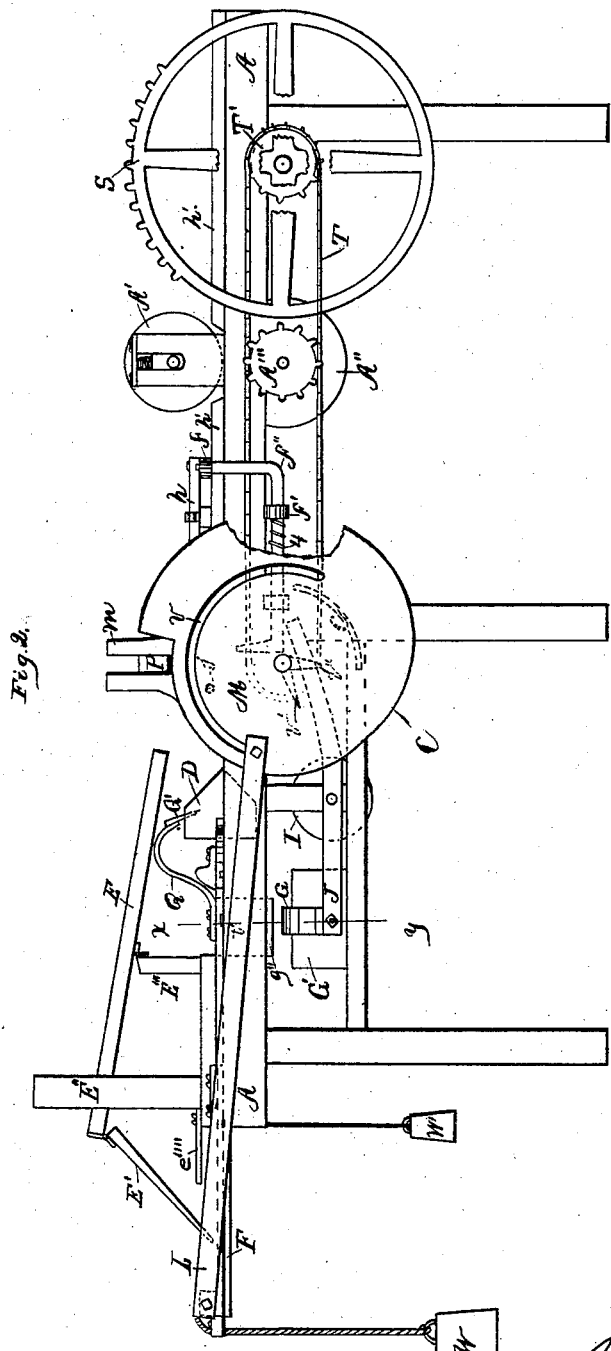

(No Model.) 9 Sheets—Sheet 3.
J. N. CHADSEY.
APPARATUS FOR MAKING SATCHEL BOTTOM PAPER BAGS.
No. 352,118. Patented Nov. 9, 1886.
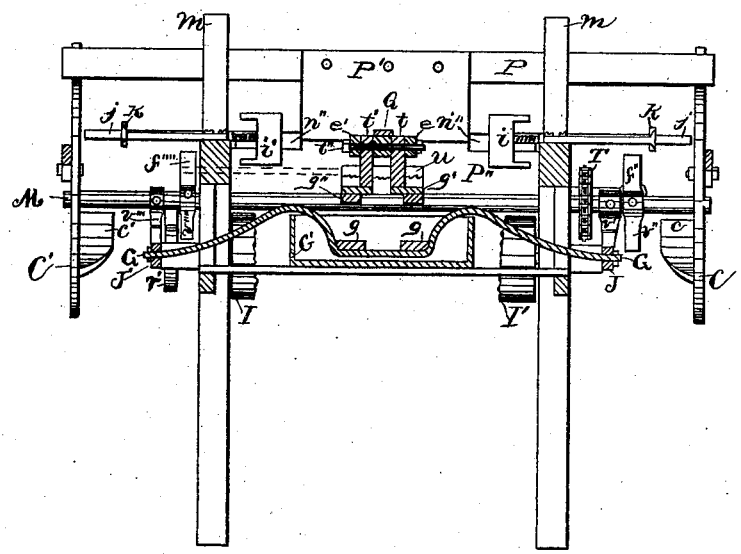
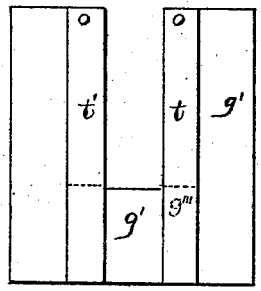
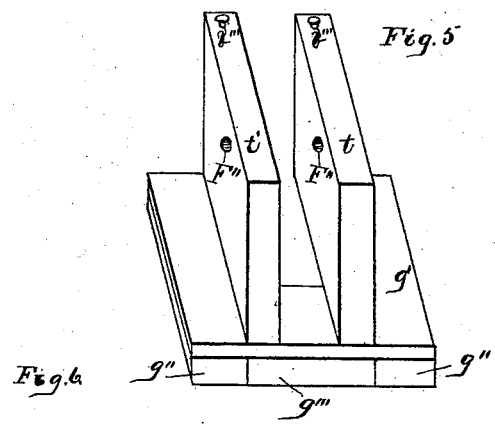
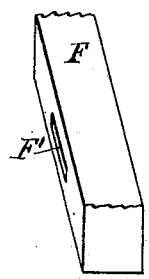
Witnesses:
N. Davenport
John T. Booth
Inventor:
John N. Chadsey
by Geo. A. Mosher
atty.
N. PETERS, Photo-Lithographer, Washington, D. C.

(No Model.) 9 Sheets—Sheet 4.

J. N. CHADSEY.
APPARATUS FOR MAKING SATCHEL BOTTOM PAPER BAGS.

No. 352,118. Patented Nov. 9, 1886.

Witnesses:

Inventor
John N. Chadsey (No Model.)  9 Sheets—Sheet 5.
J. N. CHADSEY.
APPARATUS FOR MAKING SATCHEL BOTTOM PAPER BAGS.
No. 352,118.  Patented Nov. 9, 1886.
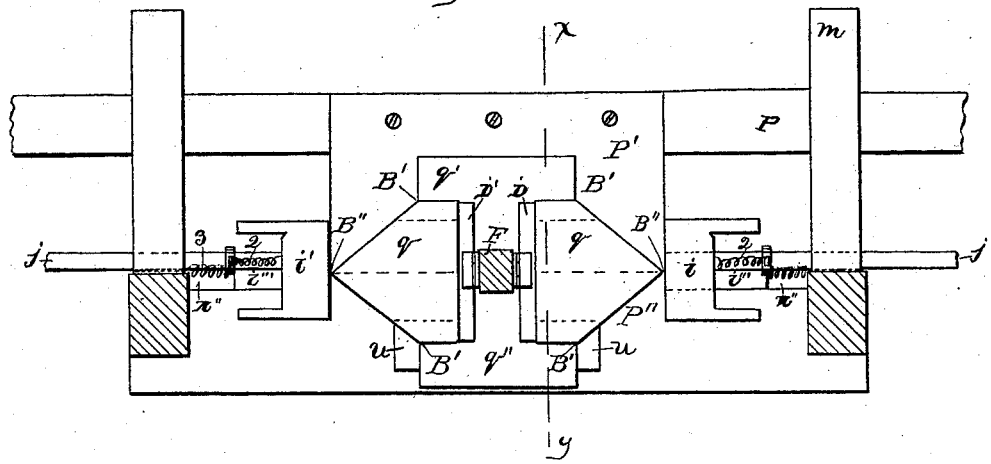
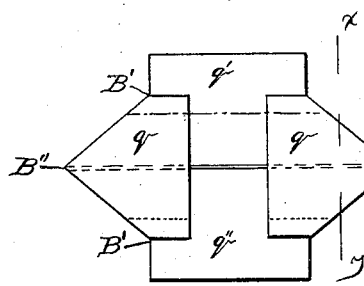
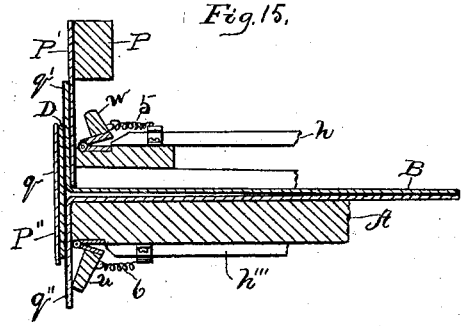
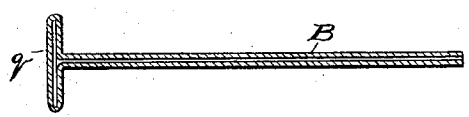
Witnesses:
N Davenport
John T. Booth
Inventor.
John N. Chadsey
by Geo. A. Mosher
Atty.

(No Model.)  9 Sheets—Sheet 6.
J. N. CHADSEY.
APPARATUS FOR MAKING SATCHEL BOTTOM PAPER BAGS.
No. 352,118.  Patented Nov. 9, 1886.
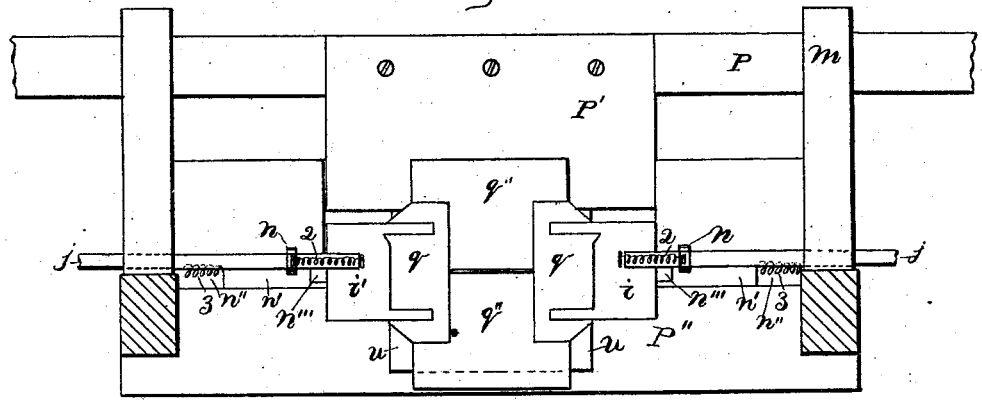
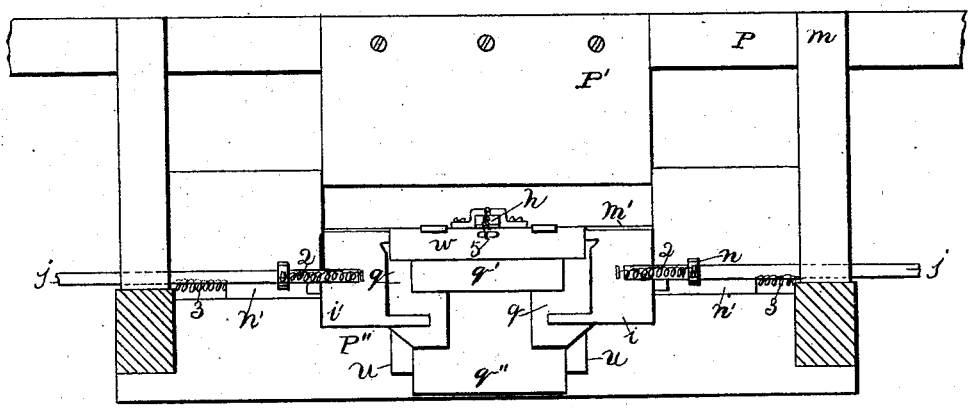
Witnesses:
Inventor:

(No Model.) 9 Sheets—Sheet 7.
J. N. CHADSEY.
APPARATUS FOR MAKING SATCHEL BOTTOM PAPER BAGS.
No. 352,118. Patented Nov. 9, 1886.
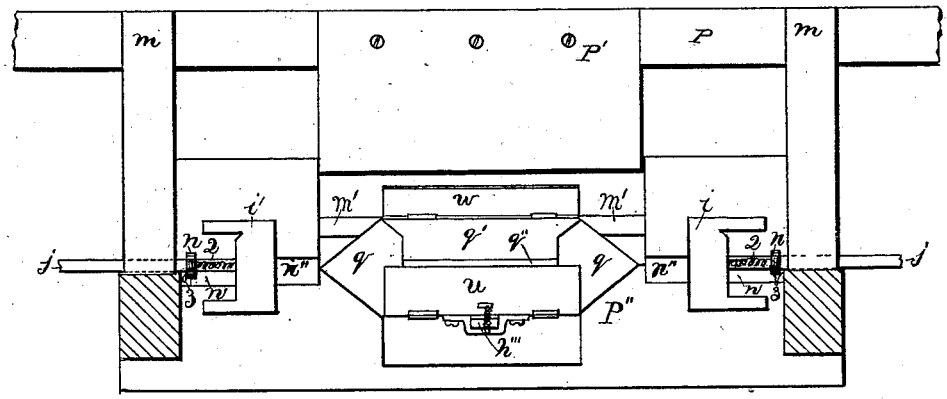
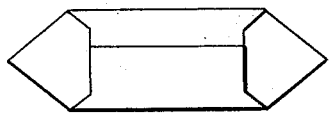
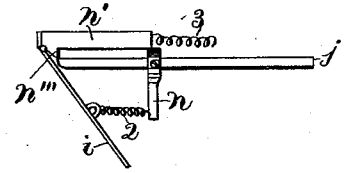
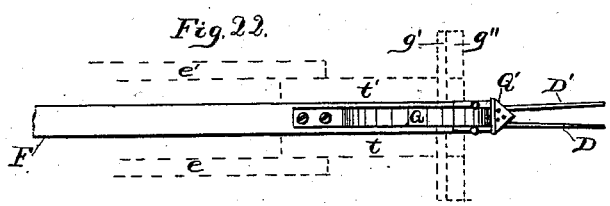
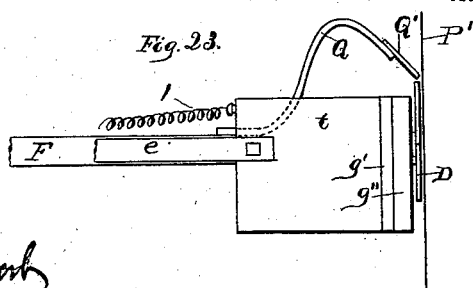
Witnesses:
N. Davenport
John T. Booth
Inventor.
John N. Chadsey
by Geo. A. Mosher
atty.

(No Model.) 9 Sheets—Sheet 8.
J. N. CHADSEY.
APPARATUS FOR MAKING SATCHEL BOTTOM PAPER BAGS.
No. 352,118. Patented Nov. 9, 1886.
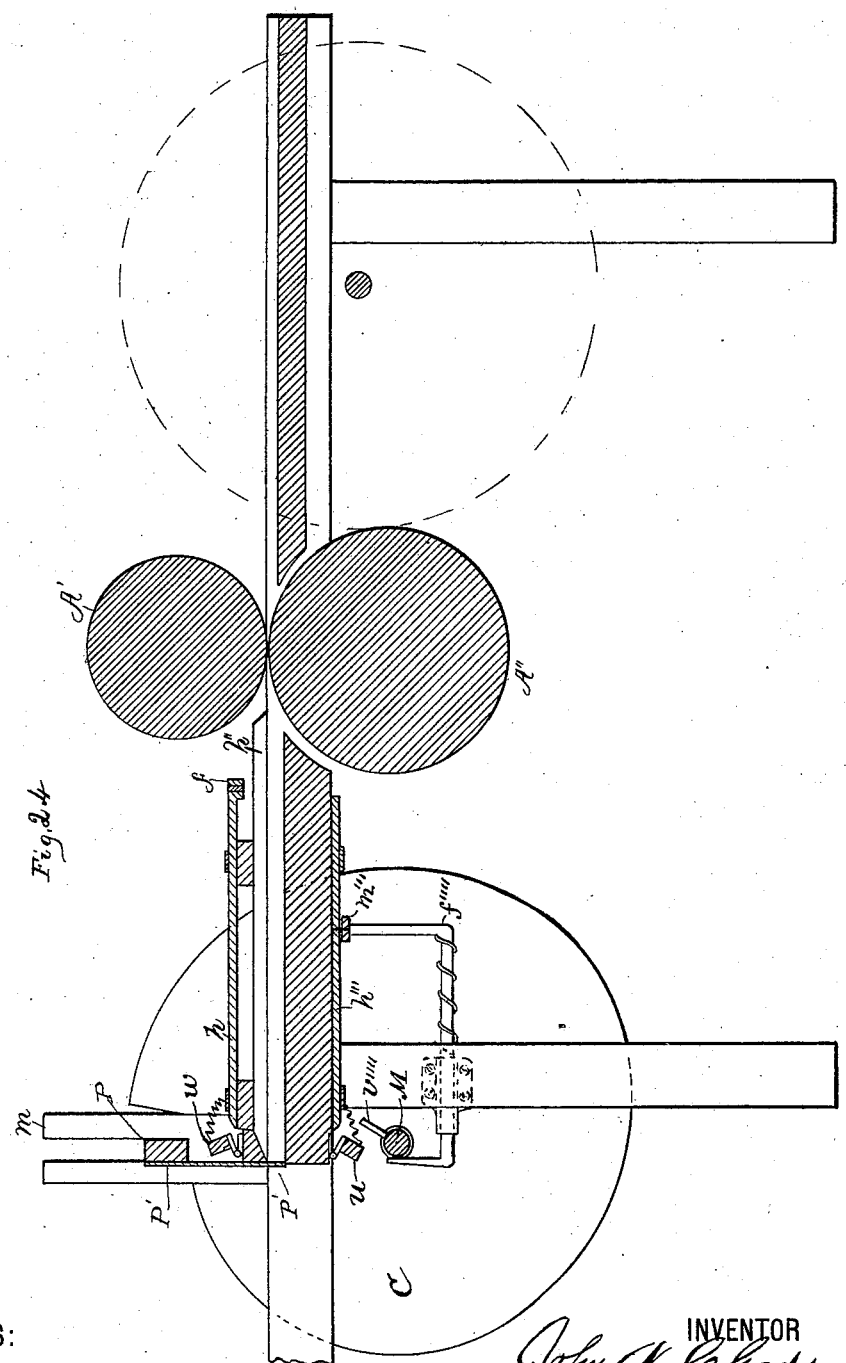

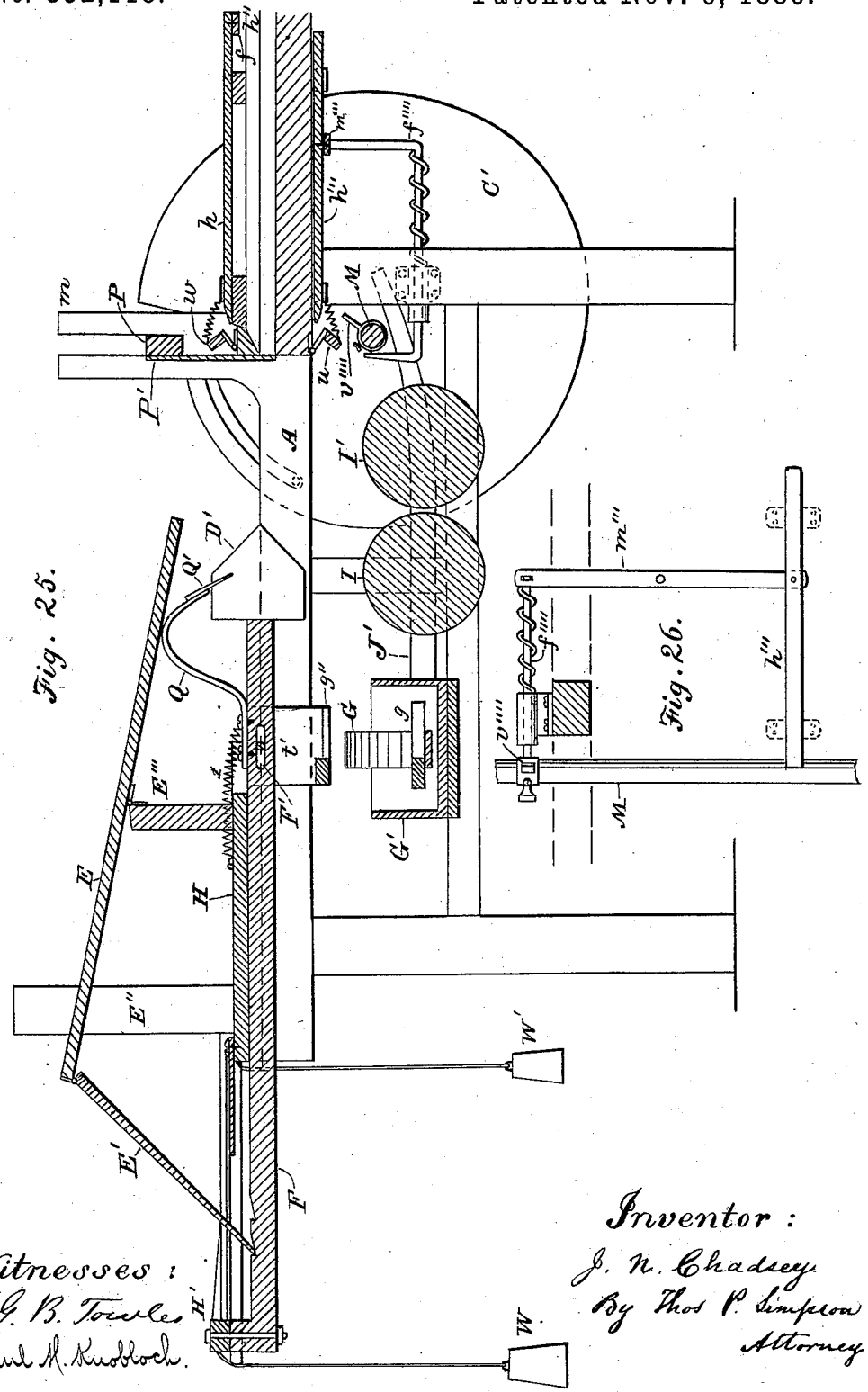

UNITED STATES PATENT OFFICE.

JOHN N. CHADSEY, OF VALATIE, NEW YORK, ASSIGNOR TO E. KENDALL, A. B. GARDENIER, A. H. FARRAR, AND S. G. CHADSEY, ALL OF SAME PLACE.

APPARATUS FOR MAKING SATCHEL-BOTTOM PAPER BAGS.

SPECIFICATION forming part of Letters Patent No. 352,118, dated November 9, 1886.

Application filed August 16, 1884. Serial No. 140,766. (No model.)

*To all whom it may concern:*

Be it known that I, JOHN N. CHADSEY, a resident of Valatie, in the county of Columbia and State of New York, have invented certain new and useful Improvements in Apparatus for Making Satchel-Bottom Bags from Paper Tubes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in apparatus for making satchel-bottom bags from paper tubes.

The objects of my invention are, first, to provide an apparatus for closing and securing one end of a paper tube to form what is known in the art as "satchel-bottom bags," in such a manner that all the successive stages of the operation may be performed by cheap and simple mechanisms capable of combination in a single machine to perform the whole operation, as hereinafter fully described; second, to provide said mechanisms and to combine the same in an automatic machine adapted to produce satchel-bottomed bags from paper tubes, as illustrated and described in the following specification and accompanying drawings.

My invention therefore consists in certain improvements in machines for making satchel-bottom bags, as hereinafter set forth and described, mechanism being provided for longitudinally slitting the flattened paper tube at one end, and automatically feeding the same, at regular intervals, to a device for forming a satchel-bottom thereon. A former is also provided for automatically creasing and folding the slitted walls of such tube, and spreading the same upon a platform or bed-plate preparatory to fastening and folding the bottom laps. A paste-presser for impregnating the bottom folds and laps of a paper bag with paste preparatory to folding said laps in the process of construction, and a paste-carrier to supply said presser with paste from a convenient paste-receptacle, are also provided. Formers are provided which are adapted to press together the end folds of the bag-bottom and determine the position of the folds for the side bottom laps preparatory to folding said laps upon each other, and a sectional platform having one of its sections adapted to slide upon a fixed support for the purpose of receiving and discharging paper-bag tubes and securing one end of the same in a position to act in conjunction with a fold-former to form the folds in the bag-bottom.

Figure 7:
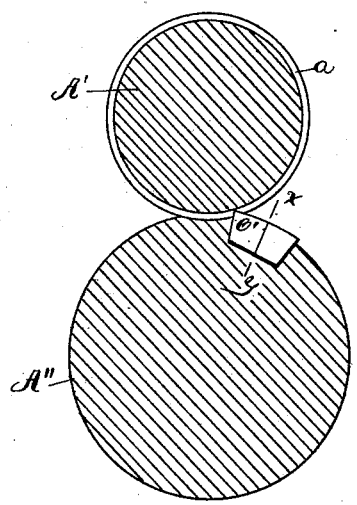
Figure 8:
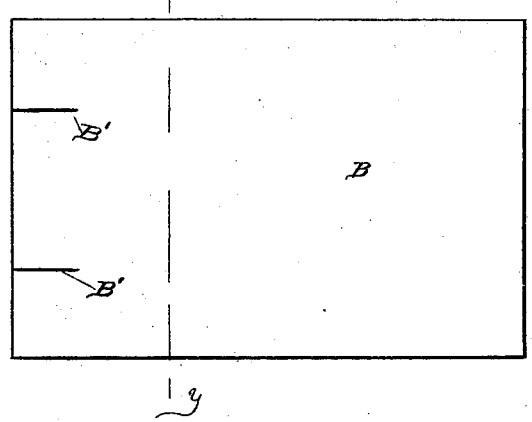
Figure 9:
Figure 10:
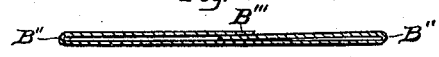
Figure 11:
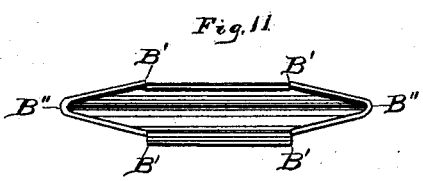
Figure 12:
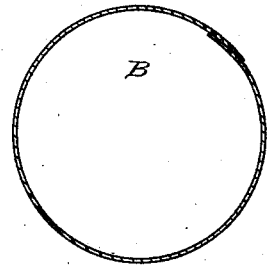

In the accompanying drawings, Figure 1 is a plan view of a machine embodying my several improved mechanisms. Fig. 2 is a side elevation of the same. Fig. 3 is a vertical cross-section taken on line *x y* in Fig. 2. Fig. 4 is a plan view of the paste-presser. Fig. 5 is a perspective view of the same. Fig. 6 is a perspective view of a part of the sliding paste-presser support, showing slot F'. Fig. 7 is a cross-section taken on line *x y* in Fig. 1, showing the slitting-knife in feed-rollers A' and A''. Fig. 8 is a plan view of a flattened paper tube, showing slits B'. Fig. 9 is a cross-section of knife O', taken on line *x y* in Fig. 7. Fig. 10 is a cross-section taken at broken line *x y* in Fig. 8, showing the folded edges B'' of a flattened paper tube. Fig. 11 is an end view of a slitted flattened paper tube. Fig. 12 is a cross-section of a paper tube before the same is flattened, and without the lapping edges shown in Fig. 10. Fig. 13 is a front elevation of the sectional platform on which the bag-bottoms are formed, with some of the adjacent parts, and showing the slitted ends of a paper tube folded against the platform by the formers D D'. Fig. 14 is a separate view of the folded end of the slitted tube. Fig. 15 is a vertical cross-section taken at line *x y* in Fig. 13, showing the relative position of former, tube folds, platform, and side-lap folders *u* and *w*. Fig. 16 is a vertical section taken at broken line *x y* in Fig. 14. Figs. 17, 18, and 19 are front elevations of the sectional platform, showing successive stages in the operation of folding the end walls of a slitted paper tube to form a bag-bottom, as hereinafter explained. Fig. 20 is a plan view of a finished bag-bottom. Fig. 21 is a plan view of the spring-controlled former *i*, hinged to its sliding spring-controlled support and its actuating slide-bar $j$. Figs. 22 and 23 are plan and elevation views of spring-controlled wedge Q, attached to traveling support F, and paste-presser. Figs. 24 and 25 are partial vertical longitudinal sections illustrating the machine. Fig. 26 is a plan view of certain details illustrating slide-bar $h'''$, located under the main table A, and connecting parts.

A designates a supporting frame or table, provided with guides $h'$ and $h''$, arranged parallel with each other and at a suitable distance apart to permit a flattened paper tube, B, Fig. 8, adapted to form a paper bag, to be inserted longitudinally and travel along said table between said guides.

A' and A'' are two impinging rollers, the former having bearings above and the latter below the surface of the table, and so arranged that their line of contact is in about the same horizontal plane as the surface of the table. The shaft of the lower roller is provided with a pinion, A''', adapted to engage with the segment-wheel S, the latter being fixed on a common shaft with cog-wheel S', which engages with toothed pinion $r$, fixed upon the shaft of driving-pulley R. The driving-roller A'' is made of such size that its circumference is equal to the length of the paper tubes, and the segment-wheel S is provided with the same number of cogs as its engaging pinion A''', from which it appears that if one end of a flattened tube is inserted between the rollers it will be carried forward just its own length by the rollers, and that the rollers will thus remain at rest until the cogged segment passes around to renew its contact with the roller-pinion, when the rollers will again be put in motion, and if another tube is inserted between the rollers it will be carried forward its own length, driving the previously-inserted tube on before it between the guides $h'$ and $h''$, thus feeding successively at regular intervals flattened paper tubes along the surface of the table; but the driving-roller A'' is provided with two knives, one of which, O', is shown in Fig. 7, which project from its periphery into the grooves $a$ $a'$ in roller A', one into each groove. The knives are so arranged upon the roller that their time of entering the grooves $a$ $a'$ is contemporaneous with the initial motion imparted to the rollers by the segment-wheel, and the tubes fed between the rollers are cut by the knives to form the slits B' through both walls of the flattened tube, extending from the ends a distance equal to the length of the knives. The knives may be beveled on both sides, or on one side only, and one side of the grooves provided with a square or sharp edge to engage therewith. As each tube is thus fed along by the rollers it passes through the vertical sectional platform P' and P'' a distance of about twice the length of the slits B', varying according to the desired width of the bag-bottoms, as shown by the dotted lines in Fig. 1, at which point of time the rollers cease to revolve, as before explained, and the sections close, as hereinafter explained, holding the tube securely in place to be operated upon by the bottom-forming mechanisms, the sections forming a vertical platform or table, against which the slitted tube-walls are folded to form the bottom of a bag. The natural elasticity of the tube-walls causes them to spring apart a short distance when released, and the projecting slitted end of the tube presents about the appearance shown in Fig. 11, and is ready to receive the creasers and formers D D', preferably made of thin or sheet metal with triangular-shaped projecting points, and hinged at their bases to a traveling support, F, which carries them to and from the projecting tube. The support rides in suitable bearings upon platform H, and is fixed at its farther end to the sliding frame H', which rides upon the projecting arms L'' L''', fixed to the platform H. The sliding frame is connected by pivoted links L L' to the eccentric wheels C C', provided with the concentric slots $v$, one of which is shown in Fig. 2, the wheels being substantially alike and acting in unison. The pivots of the contiguous ends of said links are adapted to travel in said slots, as will be more fully explained hereinafter. These slotted wheels are fixed upon a common shaft, M, which is also provided with a chain-wheel fixed thereon, to which motion is imparted by the chain T, connecting said wheel with chain-wheel T', fixed to the shaft of wheels S and S', before described. As the wheels C C' revolve in the direction of the hands of a watch, as viewed in Fig. 2, the frame H' is drawn forward or toward the wheels by the links, their pivots resting in the rear ends of the slots $v$, and with it the horizontally-traveling support F, to the forward end of which are hinged the formers D D'. The points of the formers are in the same horizontal plane with the line of contact of rollers A' A'' and the projecting slitted tube-walls, (see Fig. 2,) and enter between said walls about midway between the folded edges B'', Figs. 1, 10, and 11. While the formers are so entering, their points are spread or deflected from each other by the wedge Q', turning on their supporting-hinges. The wedge Q' is attached to one end of a spring-support, Q, the other end of the support being fixed upon the traveling support F. A superimposed lever, E, centrally hinged or fulcrumed to the upright E''', erected from platform H, is provided at one end, which end is adapted to travel vertically in the fixed guides E'', with the pivoted arm E'. As the traveling parts advance, the frame H' catches the lower or free end of arm E', and causes lever E to tip against spring Q, thereby forcing the wedge Q' down between the formers to spread them, as aforesaid. The formers continue to advance inward between the projecting tube-walls and spread until the points have pressed the walls against the vertical sectional platform P' P'', in which position they are sufficiently spread to slide on the platform, and continue spreading, without the aid of the spreading-wedge, until they extend out from each other in nearly the same vertical plane, and have pressed the projecting walls of the tube flat against the sectional platform, where they occupy the position shown in Fig. 13, the points of the formers having creased and folded the tube-walls from the slits B' to the folds B'' of the flattened tube.

The left-hand portion of Fig. 15 shows in cross-section, taken at line x y in Fig. 13, the relative position of formers, tube-walls, and sectional platform. Fig. 14 is a separate view, in elevation or plan, showing the appearance of the tube-walls, the dotted lines showing the position of subsequent folds to form the bottom side laps. A cross-sectional view taken at line x y in Fig. 14 is given in Fig. 16, showing the relative positions of the triangular-shaped folds and the flattened walls of the tube on the other side of the sectional platform.

It is apparent, therefore, from the foregoing that the formers D D' have not only transversely creased and folded the projecting end walls of the tube from the slits B' to the folded edges B'', thereby producing the triangular-shaped folded bottom ends, q q, but have transversely creased both of the horizontal flattened tube-walls from fold to fold and opened the end walls of the tube until the two parts q' and q'' are distended or folded out to or nearly to a common vertical plane, which plane is right-angular to that of the flattened tube in a position to be folded over upon the end folds, q q, and successively upon each other, to form the side laps of the bag-bottom. After the points of the formers have pressed the tube-walls in contact with the sectional platform and are spread sufficiently to slide thereon, the wedge Q' is no longer needed, and is withdrawn by the action of trip e'''', fixed upon platform H, which lifts the lower end of arm E' from contact with frame H' as the arm advances against the trip, whereupon spring Q forces up the lever E and lifts the wedge above the formers, as shown in Fig. 23. The formers are withdrawn from the folds and brought back to their original position by means of weights or some analogous device. I have shown a weight, W, attached to sliding frame H' by cords passing over fixed pulleys. The frame is released by the revolution of wheels C C' until the position of slots v is reversed, which is done by a half-revolution, when the link-pivots slip back from one end of the slot to the other, where they remain until the wheels perform another half-revolution and the ends of slots again engage the pivots. The springs d and d' serve to force the formers back into planes about parallel with each other and with the line of direction taken by their support F in traveling to and from the sectional platform. Before releasing the formers, however, another mechanism is brought into use for the purpose of applying some adhesive substance to the folds, that they may retain their position to form a bag-bottom. Various mechanisms have been heretofore employed for this purpose—as rollers, slides, &c.; but I make use of a stamp or presser, which applies the paste with a considerable degree of pressure, forcing it into the pores and depressions of the paper, and causing the folds to adhere to each other with much greater tenacity. I have shown a paste-presser in plan and in perspective in Figs. 4 and 5.

The uprights t t' are pivoted to the traveling support F by a pivot passing through apertures F'' and slot F' in the support. The uprights have a frame, g', secured to their bottom edges, the slats g'' and end piece, g''', being secured to the bottom of the frame, as shown. The bottom slats, g'' and g''', which receive on their lower surfaces the paste and press it against the bottom bag-folds, are made of such shape that the bottom surface of piece g''', with the adjoining ends of slats g'', will, when applied to the bag-bottom fold, nearly cover the bottom side lap, q'', while the slats g'' extend up to cover the lapping edges of the folds q q. The uprights t t' are also provided with pins b''', to which is attached one end of the controlling-springs 1, the other ends being secured to the fixed platform H. As the presser advances upon its support F, the springs cause it to tip or rotate upon its pivot until the bottom horizontal surfaces assume a vertical position, as shown by dotted lines in Fig. 22, and in Fig. 23 when it is in a position to come in contact with the bag-folds. As the presser reaches the position above described, the arms b b', fixed upon frame H', have advanced sufficiently to engage the arms e'' and e''', pivoted at one end to the platform H, and adapted to engage at their face ends the pins b'' at the ends of the arms e e', which are pivoted at their other ends upon the same pivot which supports the paste-presser, thereby forcing the presser forward more rapidly than the formers D D' and support F, the presser-pivot traveling forward in slot F'. From this it is apparent that the presser will be firmly pressed against the bottom folds of the bag, and will travel back to its horizontal position when the frame H' and support F are released by slot v, as before described. At the same time the weights W', attached to the pins b'', serve to bring the presser and its pivot back to its former position on support F, with the pivot at the rear end of slot F', where it remains until the working ends of slots v in wheels C C' again engage with the pivots of links L L' to advance frame H', when the operation is repeated. While the paste-presser is thus at rest it is supplied with paste from the underlying paste-receptacle G' by the paste-carrier g, of about the same size and form as presser-slats g'' and g''', being raised up against the latter from the bottom of the paste-receptacle by the supporting-arms G. The said arms G are bent to extend from the inside bottom of the paste-receptacle out to the levers J J', being pivoted at their projecting ends to one end of the levers, the latter being fulcrumed upon the projected ends of the shaft of roller I. The free ends of the levers extend past and beneath the shaft M of wheels C C', as shown by dotted lines in Fig. 2, in such a position that trips $v'$ and $v'''$, Fig. 3, fixed to revolve with shaft M, engage therewith at each revolution of the shaft, to depress the same and thereby raise the arms G and paste-carrier $g$, the latter to contact with the paste-presser or near enough to deposit paste thereon.

The trips $v'$ $v'''$ can be adjusted on shaft M by set-screws to the required position to apply paste while the paste-presser is at rest over the paste-carrier. While the paste is being thus applied the hinged formers $i$ $i'$ are forced from the position shown in Fig. 3 to the sectional platform, as shown in Fig. 13, and just as the formers D D' are withdrawn from the bottom folds the formers $i$ $i'$ are forced to turn on their hinges or pivots and occupy the position shown in Figs. 17 and 18, serving to retain the folds against the sectional platform and as guides in folding the bottom side laps, as hereinafter explained. The formers $i$ $i'$ are operated by the laterally-inclined trips or flanges $c$, projecting out from the inner sides of wheels C C', which trip the spring-controlled slide-bars $j$, sliding in uprights $m$ and supporting-arms K.

The slide-bars are each provided with a projecting arm, $n$, with the projecting ends of which the formers are connected by spring 2, as shown in the plan view in Fig. 21. The formers are also hinged to the slides $n'$, which slide in suitable slots, $n''$, and are controlled therein by spring 3. As the slide-bars $j$ advance, they force the slides $n'$ against springs 3 to the end of slots $n''$. Then as the slide-bars advance still farther they force the formers against springs 2 to turn upon their hinges until they are pressed flat against the bag-bottom folds, the bars sliding over onto the formers, as shown in Figs. 17 and 18. When in the last-described position, the formers are prevented from obeying the controlling-springs 2 and 3 by the stops $n'''$ on the slides, which come in contact with the arms $n$ until the slide-bars are released from the trips $c$, which occurs after the bottom side laps are folded, when the formers are quickly influenced by the controlling-springs and thrown back to the position shown in Fig. 19.

The object of the sliding support $n'$ is to permit the projecting arms of formers $i$ $i$, which are covered by the side laps, as shown in Fig. 18, to slide back, to be released therefrom preparatory to being acted upon by springs 2 to turn the formers on their hinges back to the position shown in Fig. 19. The side lap $q'$ is next folded over the projecting arms of the formers $i$ $i'$ by the hinged folder $w$, hinged to the cross-bar $m'$. The cross-bars $m'$ and $m''$ are secured to the upper surfaces of guides $h'$ and $h''$, crossing from one to the other, as shown, to permit the paper tubes to pass beneath them from the feed-rollers to the sectional platform, and to support the slide-bar $h$, which operates the folder $w$. Slide-bar $h$ is pivoted at one end to one end of the centrally-fulcrumed lever $f$, the other end of the lever being pivoted to one end of the spring-controlled slide-bar $f''$, which slides in fixed support $f'$. The free end of slide-bar $f''$ is adapted to be acted upon by the trip $v''$, adjustably secured to shaft M. The action of trip $v''$ upon the slide-bar $f''$ and the connecting parts forces the folder $w$ over in front of the formers $i$ $i'$ to fold the side lap $q$. As soon as the trip $v''$ slips off the angle end of the slide-bar, its controlling-spring 4 forces it back and withdraws slide-bar $h$ from the folder $w$, and the latter is brought back behind the sectional platform again by its controlling-spring 5, secured one end to the folder and the other end to the guide-loop of sliding bar $h$. Just before the proper time arrives for the folder $w$ to perform its office, the sliding section P' of the platform is elevated above the former by the arms P, which slide vertically in guides $m$, and are lifted by the eccentric periphery of wheels C C'. The eccentric portions of the peripheries of said wheels are of sufficient length to keep the section P' elevated until the next flattened tube, B, has been fed thereunder, as before explained, and has taken the place of the previously-finished bag. Immediately upon the folding of the side lap $q'$ the lower folder, $u$, folds over the other side lap, $q''$, to the position shown in Fig. 19 in substantially the same manner that lap $q'$ was folded—that is, the trip $v''''$, fixed upon shaft M, Figs. 25 and 26, acts upon spring-controlled slide-bar $f''''$, lever $m'''$, and spring slide-bar $h'''$, to operate the spring-controlled folder $u$. The slide-bar $h'''$ is loosely secured to the under side of table A, as seen in Fig. 25, and said slide-bar and connecting parts are shown in plan view in Fig. 26. The paste upon the edges of end folds $q$ causes the side lap $q'$ to adhere to them, and the paste upon the side lap $q''$ causes it to adhere to the other side lap when folded down upon it. Just as the last lap, $q''$, is folded the slide-bars $j$ are released from trips $c$, and spring 2 draws back slide $n'$ until the formers $i$ $i'$ are released from the bag-bottom folds, when the spring 3 throws the formers back upon their hinges to the position shown in Fig. 19. The folder $u$ is then withdrawn from the folds by its spring 6, the rollers A' A'' are put in motion by the segment-wheel, and another tube is fed into the sectional platform, forcing the finished bag before it down to the impinging-rollers I I', by which, as it passes between them, the pasted folds are more firmly folded and pressed together, which wholly completes the operation of forming a neat and durable satchel-bottom bag from a paper tube.

The rollers I I' are driven by a belt, $r'$, passing from a tight pulley upon the shaft of one of the rollers to a tight pulley upon the driving-shaft of the machine, as shown in Fig. 1.

What I claim as new, and desire to secure by Letters Patent, is—

1. The spring-controlled formers D D', hinged to a traveling support, in combination with a paper-tube-retaining platform, slotted wheel C, connecting-link L, and a weight, W, substantially as described, and for the purposes set forth.

2. A spring-controlled paste-presser pivoted to a traveling support adapted to travel to and from the bottom folded end of a paper-bag tube, in combination with said support and actuating mechanisms, as slotted wheel C, connecting-link L, and weight W, substantially as and for the purposes set forth.

3. A paste-carrier provided with supporting-arms G, attached to pivoted levers J, in combination with revolving trips $v'$ and $v'''$, paste-receptacle G', and a paste-presser, substantially as described, and for the purposes set forth.

4. Spring-controlled formers $i$ $i'$, hinged to sliding spring-controlled supports, in combination with said supports, operating slide-bars $j$ $j'$, and laterally-inclined trips $c$ $c'$, adapted to engage said slide-bars and force said supports against their controlling-springs and afterward said hinged formers against their controlling-springs, to press them down upon and retain in position the end folds of a paper-bag bottom, while serving as a guide in the formation of one or both of the bottom side folds, substantially as described.

5. A sectional forming-platform having one of its sections adapted to slide upon a fixed support and one end of the same in a position to have the walls of the projecting end folded against said platform, in combination with said support, a fold-former, and means for sliding said section, as eccentric wheel C, substantially as described.

In testimony whereof I have hereunto set my hand this 13th day of August, 1884.

JOHN N. CHADSEY.

Witnesses:
WM. A. VAN BRANNO,
PHILIP HARRIS.